Patented July 28, 1942

2,291,337

UNITED STATES PATENT OFFICE 2,291,337

PRODUCTION OF WOOD PRESERVING OIL FROM REFINED PITCH

Jacquelin E. Harvey, Jr., Atlanta, Ga., assignor of one-half to Southern Wood Preserving Company, East Point, Ga., a corporation of Georgia No Drawing. Application February 10, 1941, Serial No. 378,308

3 Claims. (Cl. 196—62)

The present invention relates to the induction of useful characteristics in hydrocarbons.

More specifically, the present invention relates to the induction of (1) toxicity, (2) toxicity and solvency, and/or (3) solvency in hydrocarbons of liquid and solid nature, as for instance—but not in the sense of a limitation—high boiling hydrocarbons such as still residuals, polymerized products, tars and fractions thereof, including pitches and selected or refined high boiling fractions of unique characteristics.

Viewed broadly, the starting materials of the present process are high boiling hydrocarbons of aromatic content, and may be conveniently secured from coal, wood, gas or gases.

Because of its great availability, tar derived from coal, as for instance high temperature coke oven tar or fractions thereof, will be shown as the starting material of the following examples, but it is obvious that to such illustrations attach no starting material limitation, for, as stated, high boiling hydrocarbons of aromatic content comprise the true concept of allowable starting feed stocks.

The present invention provides a novel process for inducing solvency and/or toxicity into the starting materials noted.

Prior to the present invention it was known that toxicity and solvency could be induced in the named starting materials by the controlled action of hydrogen. The employment of the process hereinafter disclosed for the first time for the induction of toxicity and/or solvency, now makes available an improved process that provides economic advantages, as compared to former proposals.

One aspect of the present invention is the inducing of toxicity into creosote, tar and tar residuals, as hereinafter explained.

*Example 1.*—A creosote or creosote-coal tar solution oil complying with A. W. P. A. specifications and having known toxicity is charged to a high pressure reaction vessel and a 50-50 mixture of hydrogen and carbon monoxide pumped in, to a top pressure of 2000 lbs. per square inch. The charge is heated to an upper limit of 420° C., the meanwhile agitating the contents of the vessel. Said heating is continued for two hours, whereupon the vessel and its contents are cooled to atmospheric temperature. Upon inspection, the thus treated creosote will be found to have an increased toxicity as flowing from toxicity-inducing hydrogenation, also the elimination of oxygen from the creosote as effecting the conversion or partial conversion of the carbon monoxide to carbon dioxide.

*Example 2.*—Coal tar having a coke residue in excess of 1%, a specific gravity of 1.1641 is charged to a high pressure reaction vessel and a 65-35 mixture of hydrogen and carbon monoxide is pumped in, to an upper limit of 4000 lbs. per square inch. The vessel is agitated, the meanwhile heating to 400° C. and the temperature held at that heat tone for two and one-half hours. The vessel and contents are cooled and the treated tar will upon inspection be found to have induced toxicity as flowing from the toxicity-inducing effect of hydrogen also the elimination of oxygen from said coal tar as effecting the conversion or partial conversion of the carbon monoxide to carbon dioxide.

*Example 3.*—A coal tar residual, as for instance one of the pitches disclosed in my Patent No. 2,082,885 is charged to a high pressure reaction vessel. A gaseous mixture of 75% hydrogen and 25% carbon monoxide is pumped in, to an upper limit of 6000 lbs. per square inch. The vessel and its contents are agitated and heated to 385° C. for a period of four hours. The vessel and contents are then cooled to atmospheric temperature and the beneficiated pitch will upon inspection be found to have a toxicity in excess of its parent material as flowing from the toxicity-inducing effect of hydrogen also the elimination of oxygen from said pitch as effecting the conversion or partial conversion of the carbon monoxide to carbon dioxide.

*Example 4.*—A coal tar from high temperature coke ovens and having a coke residue in excess of 10% is charged to a high pressure reaction vessel. A mixture of hydrogen and carbon monoxide in the percentages of 50-50, respectively, is pumped into the vessel to an upper pressure of 10,000 lbs. per square inch. The contents of the vessel are heated to 400° C. and held at that heat tone for four hours, the meanwhile keeping the contents agitated. The vessel and contents are then cooled to atmospheric temperature. By the effect of toxicity-inducing hydrogen action and elimination of oxygen from the starting material as flowing from the presence of the carbon monoxide, toxicity will be induced in the starting material.

The beneficiated starting material will be found to have a lowered coke residue, specific gravity and viscosity that make it usable en toto as a substitute for standard creosote-coal tar solution oils; however, in the event too great a percentage of low boiling oils have been induced, the excess percentage over that permissible in said solution oil may be stripped from the treated mass to provide conformance.

In lieu of using the oil en toto, or substantially en toto, as a wood preserving oil of induced toxic properties, a distillate or a stripped fraction may be recovered as the wood preservative. The distillation characterictics of the distillate or stripped fractions may be such as to provide conformance with wood preserving oil specifications extant.

Instead of using mixtures of hydrogen and carbon monoxide (the same being provided in the presence of water, if desired), carbon monoxide alone, or carbon monoxide with added water may be employed for the induction of toxicity, and such procedure may be substituted in any of the foregoing examples.

Another aspect of the present invention is the provision of the joint induction of toxicity and solvency, as hereinafter set forth.

*Example 5.*—A creosote, as for example one of the A.W.P.A. specification creosotes, is charged to a high pressure reaction vessel. Thereafter a 50–50 mixture of hydrogen and carbon monoxide is pumped in, to an upper limit of 1800 lbs. per square inch. The vessel and its contents are heated to an upper limit of 415° C., the meanwhile keeping the contents in a state of agitation. The heating period at the highest heat tone is continued for such a period of time as to induce a new low boiling point not substantially higher than 160° C. Thereafter, the vessel and its contents are allowed to cool. The beneficiated creosote is then fractionally cut at 205° C. to provide the low boiling portion thereof as a solvent of superior value, and the higher boiling portion as a wood preservative of induced toxic properties.

The point of fractionation between the solvent of superior value and the wood preservative of induced toxicity in not inflexible inasmuch as commercial solvents currently on the market have varied end points, and, by the same token, wood preservatives of current acceptance have varied initial boiling points. Thus, inasmuch as the end point of the solvent of the present invention substantially corresponds to the initial boiling point of the wood preservative, it will be immediately apparent that the point of fractionation is not inflexible, but may be varied at will.

In the tabular data shown below are some solvents and wood preservatives of current acceptance, their end points and initial boiling points, respectively.

Solvents

| Identification: | End point |
| --- | --- |
| Benzol | 120° C. |
| Tuluol | 150° C. |
| Hi-flash naphtha | 200° C. |
| Heavy naptha | Above 200° C. |

Wood preservative

| Identification: | Initial point |
| --- | --- |
| American Wood Preservers' Association | 5% at 210° C. |
| American Wood Preservers' Association | 1% at 210° C. |
| American Wood Preservers' Association | 1½% at 210° C. |
| American Wood Preservers' Association | 10% at 210° C. |
| Prussian Ry | 3% at 150° C. |
| Neville Shingle Stain Oil | 150° C. |
| Southern Pine Shingle Stain Oil | 92° C. |
| Carbolineum | 270° C. |

The present process is adapted to provide treatment of creosote (or the selected starting material) with hydrogen and carbon monoxide whereby to, among other things, provide a newly induced low boiling point which comprises the initial boiling point of the solvent, and may be controllably held at substantially any point, as for instance:

Solvents

| Identification: | Initial point |
| --- | --- |
| Benzol | 78° C. |
| Toluol | 100° C. |
| Hi-flash naphtha | 150° C. |
| High boiling crudes | 175° C. |
| Plasticizers | 160° C. and above | or, solvents of special nature may be produced, as for instance, having lower initial boiling points than any listed.

The initial or low boiling point of the overall beneficiated creosote is determined by intensity of process controls. Controls of lesser intensity producing higher initial boiling points and controls of greater intensity, other things being equal, producing lower initial boiling points.

*Example 6.*—Another aspect of the present invention, wherein jointly are produced solvents of superior value and wood preservatives of induced toxicity, resides in subjecting tar of aromatic content to the action of hydrogen and carbon monoxide. As for instance, a high temperature coke oven tar is charged to a high pressure reaction vessel; thereafter, a gaseous mixture of 65% hydrogen and 35% carbon monoxide is pumped in, to an upper limit of 3500 lbs. per square inch. A heat tone corresponding to a temperature of 400° C. is maintained for a period of time necessary to induce a newly formed low boiling point of not substantially higher than 120° C. Thereafter, the vessel and contents are cooled, the beneficiated tar withdrawn and fractionally cut at 235° C. to provide the low boiling portion thereof as a solvent of superior value and the higher boiling portion as a wood preservative of enhanced toxic properties. However, instead of recovering the solvent as a distillate or a material stripped by solvent or gas action, and the wood preservative as a residual, the solvent and wood preservative, both, may be recovered as distillates or gas stripped material.

*Example 7.*—Pitches or residual portions of tar may serve as suitable starting material for the joint production of solvents and wood preservatives in accordance with the present process. Temperatures and pressures and gaseous mixture make up are so coordinated as to preclude substantial carbon deposition. The time element is that period which provides a newly formed low boiling oil whose initial point, or any selected point thereof, conforms to the initial boiling point of the solvent desired.

*Example 8.*—A coal tar residual, as for instance a refined pitch recovered as a residual from high residue (above 355° C.) creosote and mentioned in Patent No. 2,082,885, is charged to a high pressure reaction vessel. Thereafter, a gaseous mixture of 60% hydrogen and 40% carbon monoxide is pumped in, to an upper limit of 10,000 lbs. per square inch. The contents of the vessel are agitated and heated to an upper limit of 400° C. for such a time as to depolymerize and induce a newly formed low boiling point of not in excess of 100° C., the period of time however, being short of two hours. It has been discovered that when subjecting the pitch mentioned to the dual action of hydrogen and carbon monoxide, if periods substantially longer than two hours are employed, polymerizing reactions occur, and, at times, actual loss of the newly induced fractions is experienced.

The exact time line of demarcation between polymerizing and depolymerizing reactions for various feed stocks, cannot be arbitrarily stated by a definite period, inasmuch as the pitches, refined or crude, available as starting material will have varying inspections. It can be definitely stated, however, that, other things being equal, if a certain time element which will depolymerize tars is applied to the aforementioned pitches, polymerizing reactions will occur.

The thus treated tar residual is cut at 200° C. to provide the low boiling portion thereof as a superior solvent having an aromaticity of substantially in excess of 50%; the residual portion of the treated tar fractions will be found to have no substantially polymerized fractions due to control of the time element and may serve as a wood preservative of induced toxic characteristics.

In the foregoing examples, varying percentages of hydrogen and carbon monoxide have been shown. To conform to the present process, the percentages are so chosen as to jointly, or during the practice of the process, hydrogenate and remove oxygen as aforestated.

By the term beneficiated as used in the foregoing and the appended claims, is meant the starting material at least once subjected to the action of (1) hydrogen and carbon monoxide, (2) carbon monoxide, and/or (3) carbon monoxide and water.

It is preferred to carry on the present process at a pressure in excess of 50 atmospheres and a temperature in excess of 250° C. However lower temperatures and pressures may be employed, but the time element is thereby extended.

The examples cited have shown an intermittent operation. However, continuous practice in a single reaction chamber, a series thereof, a parallel arrangement thereof, including a multiplicity thereof, may be effected, as is well known to the art.

By the term solvents of superior value is also meant to include that the solvents of the present process have a greater solvency than solvents extant.

Among other things, the present process is characterized by the lowering of coke residue, specific gravity and viscosity, with subsequent and/or consequent lowering of boiling points, so controlled as to induce (1) toxicity, (2) solvency and toxicity, and/or (3) solvency.

The present process may be practiced by first refining the starting material in the presence of the gas or gases mentioned, or gases diluted by inert gas or gases containing carbon, or steam. Thereafter process controls may be intensified for production of the desired products.

Residues resulting from any distillation or gas stripping step, may be recycled for further product production.

The solvent produced by the present process may be fractionated to provide any desired cuts.

Minor changes may be made within the scope of the appended claims.

I claim:

1. In the production of oils of the wood preserving type the process which comprises: subjecting a refined coal tar pitch to the action of a mixture of hydrogen and carbon monoxide, the percentage of hydrogen being not substantially less than 50%, at a temperature and pressure so coordinated as to depolymerize the starting material and induce newly formed low boiling toxic fractions; carrying on the process for a period of time not substantially in excess of two hours whereby to preclude substantial polymerization, thus providing an overall treated material of the wood preserving type more toxic than the starting feed stock.

2. In the production of oils of the wood preserving type the process which comprises: subjecting a refined coal tar pitch to the action of a mixture of hydrogen and carbon monoxide, the percentage of hydrogen being not substantially less than 50%, at a temperature and pressure so coordinated as to depolymerize the starting material and induce newly formed low boiling toxic fractions; carrying on the process for a period of time not substantially in excess of two hours whereby to preclude substantial polymerization, thus providing an overall treated material more toxic than the starting feed stock; and stripping from the treated material a required percentage of low boiling ends whereby to provide as a residual an oil of the wood preserving type having no greater percentage of ends boiling below a specified temperature than is permitted in specifications accepted in the trade for a tar-derived preservative.

3. In the production of oils of the wood preserving type the process which comprises: subjecting a refined coal tar pitch to the action of a mixture of hydrogen and carbon monoxide, the percentage of hydrogen being not substantially less than 50%, at a temperature and pressure so coordinated as to depolymerize the starting material and induce newly formed low boiling toxic fractions; carrying on the process for a period of time not substantially in excess of two hours whereby to preclude substantial polymerization, thus providing an overall treated material more toxic than the starting feed stock; and recovering from the treated feed stock a distillate of the wood preserving type having no greater percentage of fractions boiling below a specified temperature than is permitted by specifications accepted in the trade for a tar derived wood preservative.

JACQUELIN E. HARVEY, Jr.